(12) United States Patent
Choi et al.

(10) Patent No.: US 11,524,910 B2
(45) Date of Patent: Dec. 13, 2022

(54) BIPOLAR CDI ELECTRODE, BIPOLAR CDI ELECTRODE MODULE AND WATER TREATMENT APPARATUS USING THE SAME

(71) Applicant: DOOSAN ENERBILITY CO., LTD., Changwon-si (KR)

(72) Inventors: Hyun Sung Choi, Busan (KR); Young Hyun Cho, Seongnam-si (KR); Jang Yong You, Suwon-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 940 days.

(21) Appl. No.: 16/355,841

(22) Filed: Mar. 18, 2019

(65) Prior Publication Data
US 2019/0308893 A1    Oct. 10, 2019

(30) Foreign Application Priority Data
Apr. 4, 2018   (KR) .......................... 10-2018-0039292

(51) Int. Cl.
| | |
|---|---|
| *C02F 1/469* | (2006.01) |
| *C02F 1/00* | (2006.01) |
| *C02F 1/461* | (2006.01) |

(52) U.S. Cl.
CPC ............ *C02F 1/4691* (2013.01); *C02F 1/001* (2013.01); *C02F 2001/4619* (2013.01); *C02F 2001/46128* (2013.01); *C02F 2201/46* (2013.01)

(58) Field of Classification Search
CPC .................................................. C02F 1/4691
See application file for complete search history.

(56) References Cited

U.S. PATENT DOCUMENTS

| | | |
|---|---|---|
| 5,954,937 A | 9/1999 | Farmer |
| 8,968,546 B2 | 3/2015 | Seed et al. |
| | (Continued) | |

FOREIGN PATENT DOCUMENTS

| | | | | |
|---|---|---|---|---|
| CN | 1529917 A | 9/2004 | | |
| CN | 106063008 A | * 10/2016 | .......... | H01M 4/8605 |
| | (Continued) | | | |

OTHER PUBLICATIONS

A Korean Office Action dated Jun. 4, 2019 in connection with Korean Patent Application No. 10-2018-0039292 which corresponds to the above-referenced U.S. application.
(Continued)

*Primary Examiner* — Salil Jain
(74) *Attorney, Agent, or Firm* — Harvest IP Law LLP (57) ABSTRACT

A bipolar capacitive deionization (CDI) electrode includes a circular current collector having a central hole and inner and outer circumferential surfaces; a nano-carbon coating layer formed on at least top and bottom surfaces of the circular current collector; and a hydrophobic polymer coating layer respectively disposed over the inner and outer circumferential surfaces of the current collector. Maintenance and management is facilitated by a bipolar CDI electrode module configured such that individual parts are formed to be removably attached. A water treatment apparatus including the bipolar CDI electrode module exhibits high water treatment efficiency, superior long-term stability, and easy maintenance and management, while solving terminal corrosion problems due to the formation of a hydrophobic polymer coating layer on the surface of an electrode terminal.

17 Claims, 6 Drawing Sheets

(56) References Cited

U.S. PATENT DOCUMENTS

| | | | |
|---|---|---|---|
| 9,079,789 B2 | 7/2015 | Seed et al. | |
| 2008/0073288 A1* | 3/2008 | Fan | C02F 1/4691 |
| | | | 204/554 |
| 2011/0240474 A1* | 10/2011 | Seed | C02F 1/4691 |
| | | | 204/660 |
| 2013/0153426 A1* | 6/2013 | Sun | C02F 1/4691 |
| | | | 977/734 |
| 2016/0280566 A1 | 9/2016 | Rau, III | |
| 2018/0037478 A1* | 2/2018 | Choi | H01G 11/26 |
| 2019/0071321 A1* | 3/2019 | Sands | C02F 1/286 |

FOREIGN PATENT DOCUMENTS

| | | |
|---|---|---|
| CN | 106517423 A | 3/2017 |
| CN | 106795014 A | 5/2017 |
| JP | 2009-45608 A | 3/2009 |
| KR | 10-0501417 B1 | 7/2005 |
| KR | 1020050096926 A | 10/2005 |
| KR | 20130107041 A | 10/2013 |
| KR | 10-1482656 B1 | 1/2015 |
| KR | 10-1741529 B1 | 6/2017 |
| KR | 101741529 B1 | 6/2017 |
| KR | 10-1766871 B1 | 8/2017 |
| KR | 101766871 B1 | 8/2017 |
| KR | 10-2018-0016091 A | 2/2018 |
| KR | 20180016091 A | 2/2018 |
| KR | 1020180016092 A | 2/2018 |

OTHER PUBLICATIONS

A Korean Notice of Allowance dated Aug. 6, 2019 in connection with Korean Patent Application No. 10-2018-0039292 which corresponds to the above-referenced U.S. application.

\* cited by examiner

Related Art

BIPOLAR CDI ELECTRODE, BIPOLAR CDI ELECTRODE MODULE AND WATER TREATMENT APPARATUS USING THE SAME

CROSS REFERENCE TO RELATED APPLICATIONS

The present application claims priority to Korean Patent Application No. 10-2018-0039292, filed Apr. 4, 2018, which is incorporated herein by reference in its entirety.

BACKGROUND OF THE DISCLOSURE

1. Field of the Disclosure

The present invention relates to a bipolar capacitive deionization (CDI) electrode, a bipolar CDI electrode module, and a water treatment apparatus including the electrode and module, and more particularly to an apparatus as above in which maintenance and repair are made easy by virtue of the use of a removable electrode in order to increase long-term stability while alleviating problems of current loss, non-uniform voltage, and corrosion owing to a terminal structure.

2. Description of the Background Art

Capacitive deionization (CDI) is a technique for removing ionic impurities contained in raw water through the adsorption and desorption of ions in an electric double layer (EDl) formed at the charged electrode interface. Specifically, when voltage is applied within a potential range in which the electrolysis reaction of raw water does not occur, certain charges are generated at the electrodes. When brine water, which is raw water containing ions, passes through the charged electrodes, opposite-polarity ions in the raw water move to respective electrodes by electrostatic attraction and are adsorbed on the electrode surfaces. Water having passed through the electrodes becomes desalinated water having no ions.

Here, the amount of ions adsorbed by the electrodes is determined by the electrode capacitance, and thus the electrodes used for CDI are generally porous carbon electrodes having a large specific surface area.

Meanwhile, when the adsorption capacity of the electrodes is saturated, the ions of influent water may be emitted in the state of being contained in effluent water. Accordingly, in order to desorb the ions adsorbed by the electrodes, electrode regeneration is performed by shorting the saturated electrodes or by applying to the electrodes a potential opposite to the adsorption potential, whereby the adsorbed ions are quickly desorbed.

As described above, CDI technology is known as an environmentally friendly desalination process that is very simple to operate and does not release environmental pollutants during desalination because the adsorption and desorption are implemented through changes in the electrode potential.

Meanwhile, membrane capacitive deionization (MCDI) is an improvement of CDI technology by which the selectivity of adsorbed ions may be increased by forming an ion exchange membrane on the electrode surface. However, MCDI devices increase the overall capital expenditure due to the use of expensive ion exchange membranes.

In order to increase the salt removal efficiency, a conventional CDI or MCDI device is typically configured such that the flow path is designed to be narrow, that is, about 100 μm. However, these conventional devices are liable to cause a fouling phenomenon owing to the narrow flow path and increase the difficulty in manufacturing a CDI module having a large-area serial structure, which limits efforts to increase productivity.

Also, the conventional CDI electrode typically has a quadrangular shape, and the desalination reaction does not occur at the corners and instead corrosion occurs there, lowering the desalination efficiency. With the goal of solving this problem, a circular CDI electrode has been devised. The circular CDI electrode is configured to include a protrusive current collector protruding from a circular current collector in order to enable connection of an electrical terminal. In the case where the electrical terminal is corroded, deterioration occurs in the protrusive structure of the current collector and cracking is thus caused (Korean Patent Application Publication No. 10-2018-0016091: Laid-open date: Feb. 14, 2018).

Moreover, the conventional CDI electrode is problematic because voltage becomes non-uniform and resistance may increase due to the corrosion of the electrical terminal resulting from the electrochemical reaction during long-term operation, making it difficult to realize stable long-term operation. Therefore, it is necessary to develop a CDI electrode having a minimized fouling phenomenon, no corrosion problem, and improved long-term stability.

SUMMARY OF THE DISCLOSURE

Accordingly, an objective of the present invention is to provide a bipolar CDI electrode having a minimized fouling phenomenon, no corrosion at electrode corners, and improved long-term stability, a bipolar CDI electrode module including the bipolar CDI electrode, and a water treatment apparatus including the bipolar CDI electrode module.

The above and other objectives and advantages of the present invention will become apparent from the following description of preferred embodiments.

In order to accomplish the above objective, there is provided a bipolar capacitive deionization (CDI) electrode including a circular current collector having a central hole and inner and outer circumferential surfaces; a nano-carbon coating layer formed on at least top and bottom surfaces of the circular current collector; and a hydrophobic polymer coating layer respectively disposed over the inner and outer circumferential surfaces of the current collector. The bipolar CDI electrode may further include an anode formed at one of top and bottom surfaces of the bipolar CDI electrode and a cathode formed at the other surface.

The hydrophobic polymer coating layer may include at least one selected from the group consisting of polytetrafluoroethylene (PTFE), polyvinylidene fluoride (PVDF), polyethylene terephthalate (PET), polypropylene (PP), methylcyclohexane, and epoxy.

According to another aspect of the present invention, there is provided a bipolar capacitive deionization (CDI) electrode module including a cylindrical module housing having a central hole; a first inlet cap and an outlet cap respectively provided at opposite ends of the module housing, each of the first inlet cap and the outlet cap having a central hole; a second inlet cap and at least one bipolar CDI electrode sequentially disposed at predetermined intervals between the first inlet cap and the outlet cap; a first terminal joined to the second inlet cap through the first inlet cap; and a second terminal joined to the outlet cap.

The first terminal and the second terminal may be made of a copper material.

The bipolar CDI electrode module may further include a hydrophobic polymer coating layer formed on a portion of an outer circumference of the first terminal, and the hydrophobic polymer coating layer of the module may include at least one selected from the group consisting of polytetrafluoroethylene (PTFE), polyvinylidene fluoride (PVDF), polyethylene terephthalate (PET), polypropylene (PP), methylcyclohexane, and epoxy.

The second inlet cap may include a first cap housing; and a first copper layer, a first current collector layer, and a first nano-carbon coating layer sequentially arranged on a surface of the first cap housing, the first copper layer and the first current collector layer being completely sealed by the first cap housing. The outlet cap may include a second cap housing; and a second copper layer, a second current collector layer, and a second nano-carbon coating layer sequentially arranged on a surface of the second cap housing, the second copper layer and the second current collector being completely sealed by the second cap housing. The first terminal may be formed to penetrate the second inlet cap up to the first copper layer and may be configured to be removably attached to the first inlet cap and the second inlet cap.

The bipolar CDI electrode module may further include a hydrophobic polymer coating layer respectively disposed over inner and outer circumferential surfaces of each of the at least one bipolar CDI electrode.

The bipolar CDI electrode module may further include a nano-carbon coating layer formed on at least top and bottom surfaces of the bipolar CDI electrode.

One of the first terminal and the second terminal may be formed as an anode and the other of the first terminal and the second terminal may be formed as a cathode.

One surface of the bipolar CDI electrode may be formed as an anode and the other surface of the bipolar CDI electrode may be formed as a cathode.

The at least one bipolar CDI electrode may consist of a plurality of bipolar CDI electrodes.

The first inlet cap may be configured to be removably attached to the module housing. The second inlet cap may include an outer circumferential surface on which first screw threads are formed such that the second inlet cap can be removably attached to the module housing, and the outer circumferential surface may have a flow path groove formed in a longitudinal direction of the module housing.

The outlet cap may have an outer circumferential surface on which second screw threads are formed such that the outlet cap can be removably attached to the module housing.

According to another aspect of the present invention, there is provided a water treatment apparatus including a raw water supply pipe; a cartridge filter for filtering particulate matter contained in raw water supplied from the raw water supply pipe; and a bipolar capacitive deionization (CDI) electrode module for desalinating a filtrate filtered through the cartridge filter. The bipolar CDI electrode module may include a cylindrical module housing having a central hole; a first inlet cap and an outlet cap respectively provided at opposite ends of the module housing, each of the first inlet cap and the outlet cap having a central hole; a second inlet cap and at least one bipolar CDI electrode sequentially disposed at predetermined intervals between the first inlet cap and the outlet cap; a first terminal joined to the second inlet cap through the first inlet cap; and a second terminal joined to the outlet cap. The bipolar CDI electrode module may consist of a plurality of bipolar CDI electrode modules disposed in an arrangement including at least one of a parallel connection of the bipolar CDI electrode modules and a series connection of the bipolar CDI electrode modules.

According to the present invention, a bipolar CDI electrode is provided in a circular shape, thus solving problems of corrosion occurring at corners of a quadrangular CDI electrode, and a protrusive current collector protruding from one side of a circular CDI electrode is eliminated, thereby solving problems of cracking owing to the corrosion of the electrode or the protrusive current collector.

In addition, according to the present invention, a bipolar CDI electrode module is configured such that individual elements of the module are removably attached, thus facilitating maintenance and repair, and also, a hydrophobic polymer coating layer is formed at a portion in which the electrode and the current collector come into direct contact with water, thus minimizing the likelihood of corrosion. Thereby, a water treatment apparatus including the bipolar CDI electrode module is advantageous because it has a dramatically increased lifetime compared to an existing water treatment apparatus.

However, the effects of the present invention are not limited to the foregoing, and other effects not mentioned herein will be able to be clearly understood by those skilled in the art from the following description.

DETAILED DESCRIPTION OF THE DISCLOSURE

Before preferred embodiments of the present invention are described in detail with reference to the accompanying drawings, it must be noted that the terms and words used in the present specification and claims should not be interpreted as being limited to typical meanings or dictionary definitions, but should be interpreted as having meanings and concepts relevant to the technical scope of the present invention.

These embodiments are merely set forth to illustrate the present invention but are not to be construed as limiting the scope of the present invention, as will be apparent to those skilled in the art.

Throughout the specification, it is also to be understood that when any part is referred to as "comprising" or "including" any element, it does not exclude other elements, but may further include other elements unless otherwise stated.

Terms indicating spatial relations may be used to more easily describe the relation between one part and another part in the drawings. Such terms are intended to include not only meanings intended in the drawings, but also other meanings or operations of an apparatus in use. Further, when an element is referred to as being disposed "on" or "over" another element, it may indicate that the former element is disposed immediately on or over the latter element or that another element is interposed. However, when an element is referred to as being disposed "immediately on" or "immediately over" another element, it may indicate that no elements are interposed.

In order to clearly illustrate the invention proposed in the drawings, parts not related to the description are omitted, and the same parts are denoted by the same reference numerals throughout the specification.

Figure 1A:
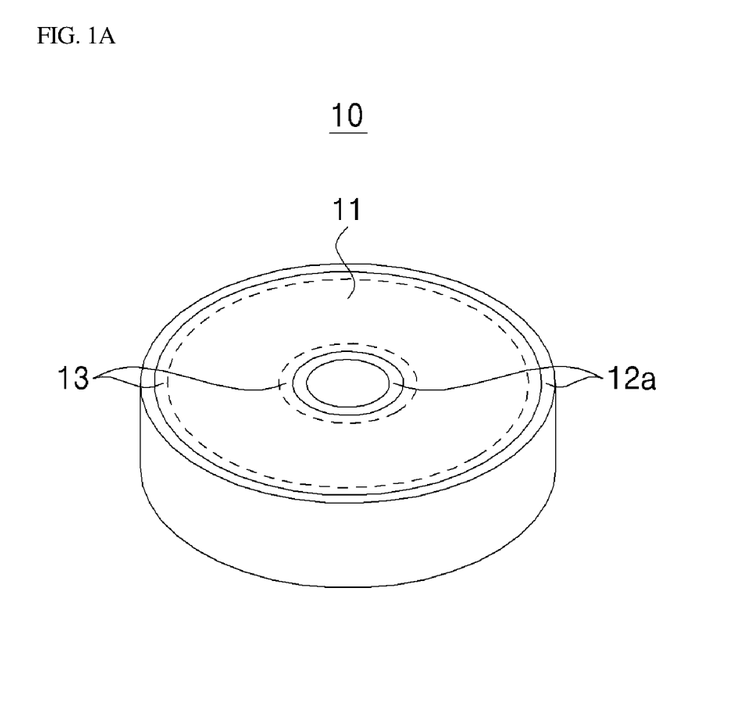
FIG. 1A is a perspective view of a bipolar CDI electrode according to an embodiment of the present invention.
Figure 1B:
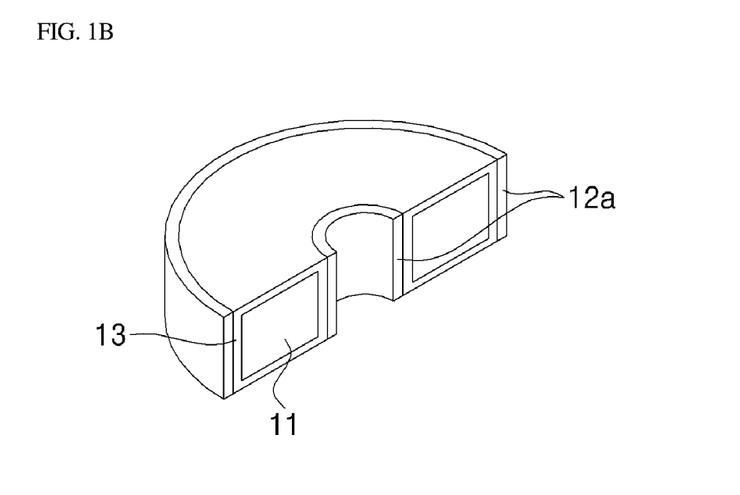
FIG. 1B is a cutaway view of the bipolar CDI electrode of FIG. 1A.

With reference to FIGS. 1A and 1B, a bipolar CDI electrode 10 according to an embodiment of the present invention includes a circular current collector 11 having a hole through its center, a nano-carbon coating layer 13 encasing the surfaces of the current collector 11, and a hydrophobic polymer coating layer 12a formed on each of the inner circumference and the outer circumference of the annular shape of the current collector 11.

Figure 2:
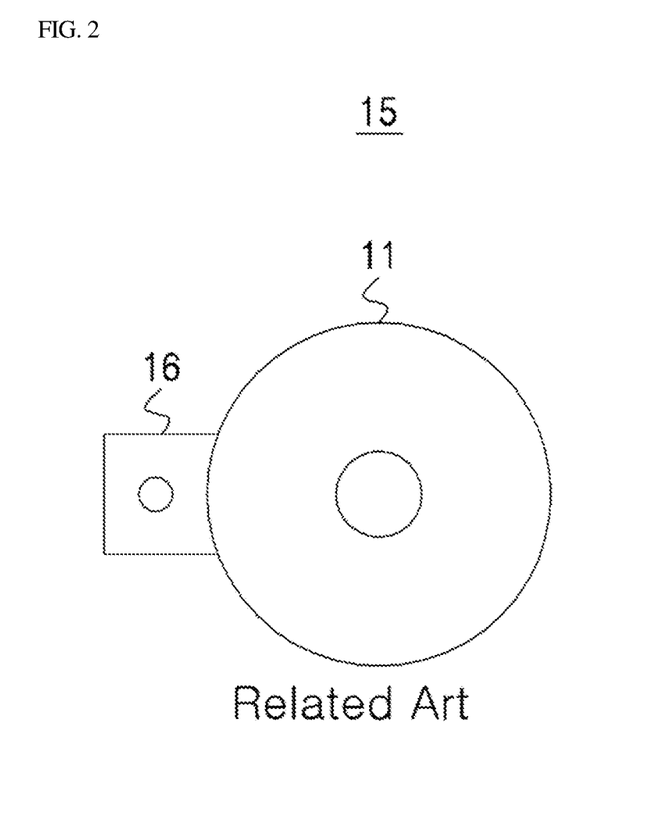
FIG. 2 is a plan view of a conventional CDI electrode.

A conventional CDI electrode 15 includes, as shown in FIG. 2, a circular current collector 11 having a hole through its center, and a protrusive current collector 16 protruding from the current collector 11. A hole is formed in the protrusive current collector 16 and a stainless steel (SUS) terminal is inserted into the hole, whereby an anode or a cathode is formed at the CDI electrode 15.

Upon charging and discharging of the conventional CDI electrode 15, the SUS terminal may corrode due to an electrochemical reaction, and such corrosion increases resistance and causes current loss, resulting in non-uniform voltage, thereby lowering the salt removal efficiency. The protrusive current collector 16 may also corrode and deteriorate, thus damaging the CDI electrode 15 by incurring cracking, overvoltage, and overcurrent conditions. The bipolar CDI electrode 10 according to the present invention, on the other hand, operates in a bipolar manner, without a current collector protruding from the current collector 11, and thus avoids the above problems of the conventional CDI electrode 15, whereby the long-term stability of the electrode may be improved.

Referring again to FIGS. 1A and 1B, the formation of the nano-carbon coating layer 13 on the surfaces of the current collector 11 improves ion adsorption efficiency on all sides of the current collector 11. Meanwhile, the hydrophobic polymer coating layer 12a blocks ion adsorption on the inner and outer circumferential surfaces of the current collector 11 and in turn prevents corrosion of these surfaces.

Here, the nano-carbon coating layer 13 is formed on the entire surface of the current collector 11, after which the hydrophobic polymer coating layer 12a is formed on each of the inner circumference and the outer circumference of the current collector 11, atop the nano-carbon coating layer 13, whereby the ion adsorption reaction may be carried out only on two opposing surfaces of the current collector 11 (FIG. 1B).

The current collector 11 may be manufactured using various materials conventionally used in the art, and is preferably made of graphite. The nano-carbon coating layer 13 is formed on at least the top and bottom surfaces of the current collector 11, through which adsorption and desorption of ions may occur.

The hydrophobic polymer coating layer 12a may include at least one polymer selected from the group consisting of a fluorine-based polymer such as polytetrafluoroethylene (PTFE) and polyvinylidene fluoride (PVDF); polyethylene terephthalate (PET); polypropylene (PP); methylcyclohexane; and epoxy. However, the specific kinds of polymer are not necessarily limited to these. Preferably, a polymer containing at least one functional group selected from the group consisting of methylcyclohexane, polytetrafluoroethylene, and epoxy is included.

Figure 3:
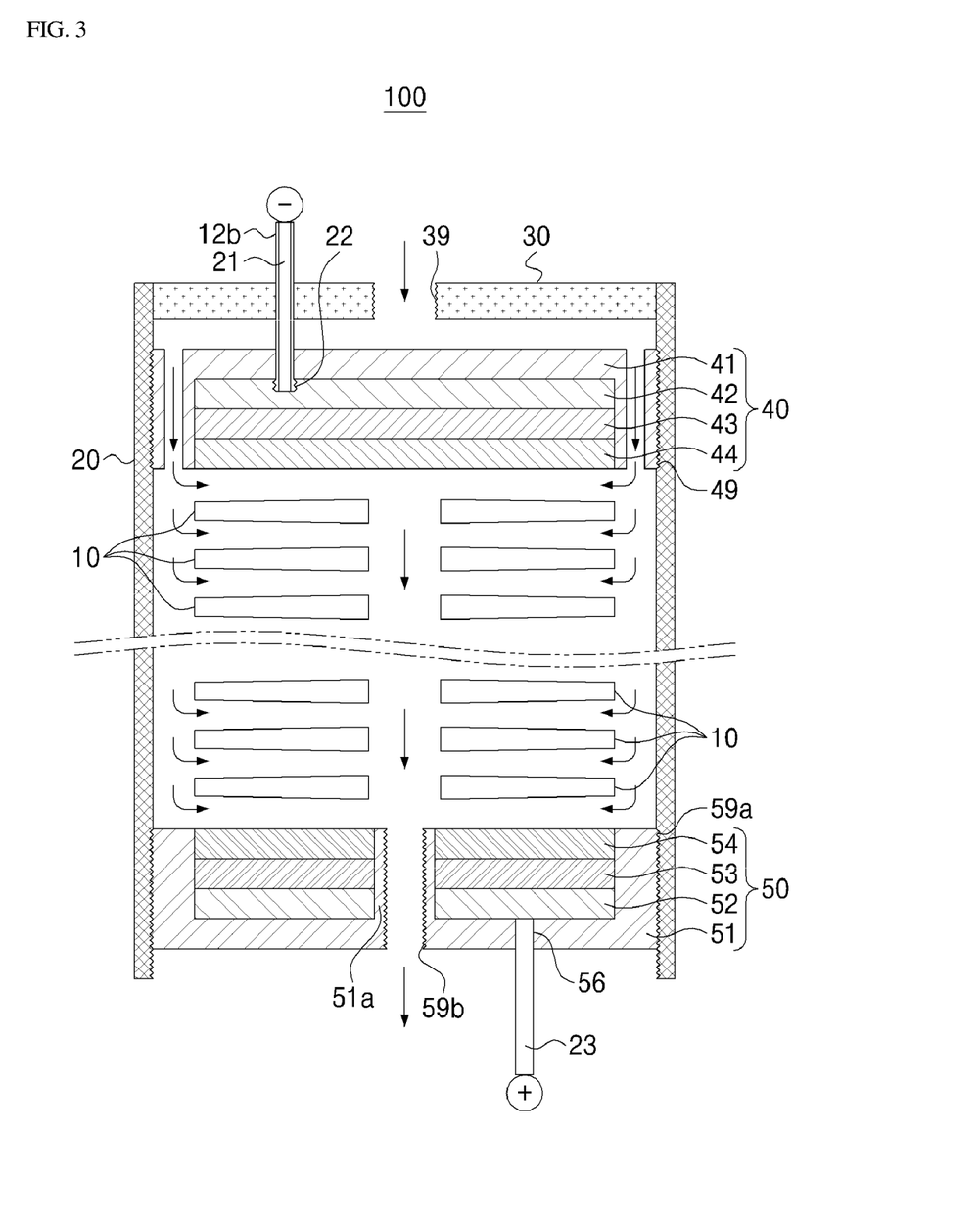
FIG. 3 is a schematic cross section of a bipolar CDI electrode module according to an embodiment of the present invention.

FIG. 3 shows a bipolar CDI electrode module 100 according to an embodiment of the present invention. The bipolar CDI electrode module 100 includes a cylindrical module housing 20 having a hole through its center; a first inlet cap 30 and an outlet cap 50 respectively provided at opposite ends of the module housing 20 and each having a central hole; a second inlet cap 40 and a plurality of bipolar CDI electrodes 10 (consistent with that of FIG. 1) sequentially disposed at a predetermined interval between the first inlet cap 30 and the outlet cap 50; a first terminal 21 joined to the second inlet cap 40 through the first inlet cap 30; and a second terminal 23 joined to the outlet cap 50. A cation exchange member, a spacer, and an anion exchange membrane may be sequentially disposed between each of the individual bipolar CDI electrodes 10.

The module housing 20 has the general shape of an annular cylinder in which the central hole is a path through which raw water flows. Raw water flows into one end of the module housing 20 and flows out from the other end, and ions in the raw water are adsorbed to or desorbed from the circular bipolar CDI electrode 10, thereby removing impurities such as salts or ions contained in the raw water.

In the module housing 20, the first inlet cap 30, the second inlet cap 40, a plurality of bipolar CDI electrodes 10 and the outlet cap 50 are sequentially disposed, and all of them are provided in a circular shape, thus preventing the occurrence of problems of corrosion and reduction in desalination efficiency at the corners of the module having the conventional quadrangular CDI electrode.

Figure 4:
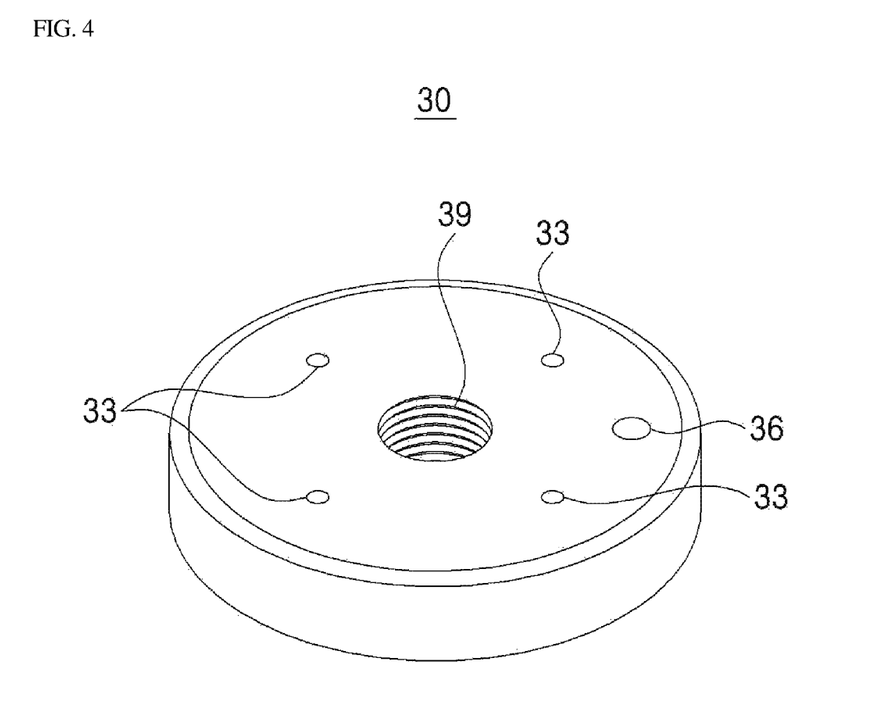
FIG. 4 is a perspective view of the first inlet cap of the bipolar CDI electrode module of FIG. 3.

FIG. 4 shows the first inlet cap 30 of the bipolar CDI electrode module 100 according to the present invention. The first inlet cap 30 has a hole formed through its center, the hole being part of a flow path that allows raw water to flow into the module housing 20. The first inlet cap 30 also has a first terminal hole 36 spaced a predetermined interval apart from the central hole.

The first inlet cap 30 is formed to be removably attached to the module housing 20, which may be achieved by means of at least one screw hole 33 formed in the first inlet cap 30. Specifically, a screw is fitted into a screw hole 33 in the state in which the first inlet cap 30, the second inlet cap 40 and the module housing 20 are joined together, whereby the first inlet cap 30, and the second inlet cap 40 are coupled. Detachment and decoupling are enabled by removing the screw. In the joined state, the first inlet cap 30 is capable of sealing the module housing 20 such that raw water is prevented from flowing into the module housing 20 except by way of the central hole.

The central hole of the first inlet cap 30 is provided with first inner screw threads 39, which are thus formed on an inner circumference of the first inlet cap 30. A supply pipe (not shown) for supplying raw water may be screwed into the threads 39, such that a supply of raw water may be introduced into the module housing 20.

Figure 5:
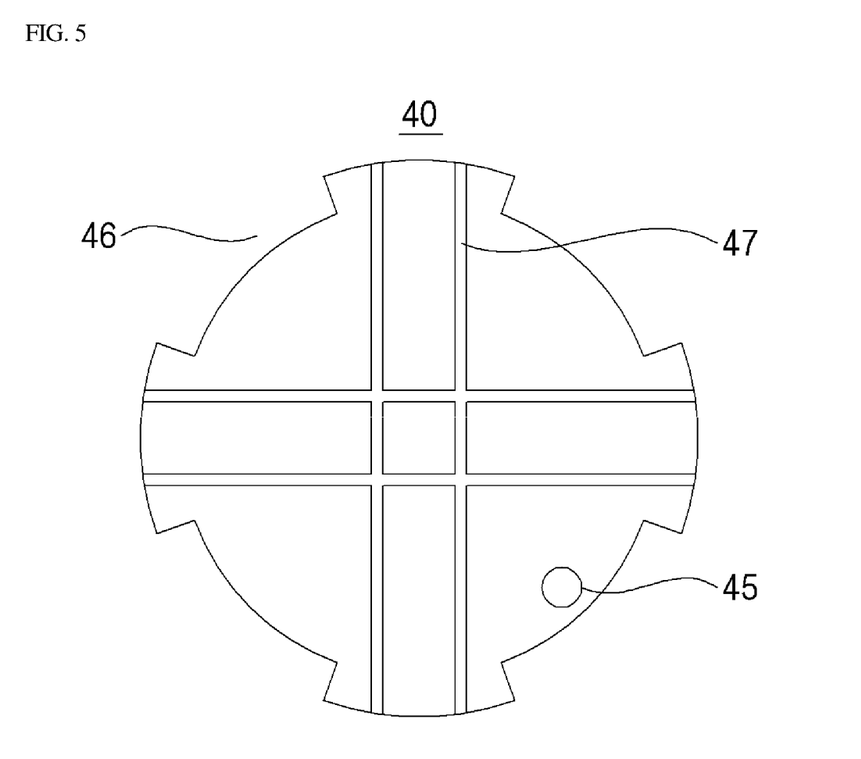
FIG. 5 is a perspective view showing the second inlet cap of the bipolar CDI electrode module of FIG. 3.

With reference to FIGS. 3 and 5, the second inlet cap 40 of the bipolar CDI electrode module 100 according to the present invention includes a first cap housing 41, a first copper layer 42, a first current collector layer 43, and a first nano-carbon coating layer 44. The layers 42, 43, and 44 are sequentially stacked on one (bottom) surface of the first cap housing 41. As such, the first cap housing 41 surrounds and encloses the first copper layer 42 and the first current collector layer 43 and surrounds at least a portion of the outer circumferential surface of the first nano-carbon coating layer 44, whereby the first copper layer 42 and the first current collector layer 43 may be prevented from coming into contact with water.

The other (top) surface of the first cap housing 41 faces the first inlet cap 30 and is disposed so as to be spaced apart from the first inlet cap 30 by a predetermined interval. The first nano-carbon coating layer 44 faces the bipolar CDI electrodes 10.

The outer circumference of the second inlet cap 40 is provided with first outer screw threads 49 so as to enable removable attachment of the second inlet cap 40 to the module housing 20. The second inlet cap 40 also has a flow path groove 46 formed in the longitudinal direction of the module housing 20. Raw water introduced into the module housing 20 through the first inlet cap 30 may reach the bipolar CDI electrode 10 along the flow path groove 46.

In addition, the second inlet cap 40 has a terminal groove 45 formed at a position corresponding to the first terminal hole 36 in the first inlet cap 30, which are aligned when the first inlet cap 30 and the second inlet cap 40 are joined in the module housing 20. The terminal groove 45 is formed to completely penetrate the first cap housing 41 to thus bring the first terminal 21 into contact with the first copper layer 42 through the first inlet cap 30. Furthermore, the terminal groove 45 may be selectively formed to penetrate a portion of the first copper layer 42.

The first terminal 21 is formed to be removably attached to the first inlet cap 30 and the second inlet cap 40, and is joined to the second inlet cap 40 so as to enable electrical connection by coming into contact with the first copper layer 42. This joining may be achieved through screwing the first terminal 21, having first terminal screw threads 22 formed at its penetrating end, into the first copper layer 42, as shown in FIG. 3. Alternatively, the electrical connection joining may be achieved through screwing of the first terminal 21 and the first inlet cap 30, or may be achieved by simultaneously applying these two joining members.

Also, the surface of the first terminal 21 may be provided with a hydrophobic polymer coating layer 12b. The hydrophobic polymer coating layer 12b, which protects the first terminal 21 from corrosion, is not formed on either end of the first terminal 21, that is, the end contacting the first copper layer 42 and the end connected to the power source. When the bipolar CDI electrode module 100 is fully assembled, an electrode material such as copper that constitutes the first terminal 21 does not come into direct contact with raw water, thus preventing corrosion of the first terminal 21. Here, the first terminal 21 as described above and the second terminal 23, which will be described later, are preferably made of copper, which exhibits high electrical conductivity compared to a conventional SUS terminal.

The second inlet cap 40 has an upper surface, facing the first inlet cap 30, in which may be formed a joining groove 47 for aiding removable attachment of the second inlet cap 40 to the module housing 20. To remove the second inlet cap 40, a tool (not shown) having a protrusion shaped in correspondence to the joining groove 47 is placed in the joining groove 47 and turned. The joining groove 47 may be provided in a variety of configurations, such as a straight line, cross, or hexagon, in addition to the shape shown in FIG. 5. The second inlet cap 40 may have at least one screw groove (not shown) formed corresponding to the screw hole 33 in the same surface as the surface having the joining groove 47 such that the first inlet cap 30 may be joined to the second inlet cap 40.

The plurality of bipolar CDI electrodes 10 are arranged between the second inlet cap 40 above and the outlet cap 50 below.

The outlet cap 50 includes a second cap housing 51, a second copper layer 52, a second current collector layer 53, and a second nano-carbon coating layer 54. The layers 52, 53, and 54 are sequentially stacked on one (top) surface of the second cap housing 51. As such, the second cap housing 51 surrounds and encloses the second copper layer 52 and the second current collector layer 53 and surrounds at least a portion of the outer circumference of the second nano-carbon coating layer 54, whereby the second copper layer 52 and the second current collector layer 53 may be prevented from coming into contact with water.

Here, the second nano-carbon coating layer 54 faces the bipolar CDI electrode 10. The second nano-carbon coating layer 54 may be formed by coating one surface of the second current collector layer 53 with nano-carbon powder, or alternatively, may be the same as in the aforementioned bipolar CDI electrode 10.

Additionally, the outlet cap 50 has a central hole for discharging water from the inside of the CDI electrode module 100. Second screw threads 59a are formed on the outer circumferential surface of the outlet cap 50 so as to enable removable attachment to the module housing 20, which is provided with corresponding screw threads on a corresponding inner circumferential surface. Thus, the outlet cap 50 may be removably attached in a screwing manner to one end of the module housing 20.

Furthermore, the central hole of the outlet cap 50 is provided with second inner screw threads 59b, which are thus formed on an inner circumferential surface of the outlet cap 50. A discharge pipe (not shown) for discharging effluent water may be is screwed into the threads 59b, such that the effluent water may be discharged from the bipolar CDI electrode module 100.

As such, the second cap housing 51 may include an extension portion 51a, which extends along the inner circumferential surface of the outlet cap 50 so that the second copper layer 52 and the second current collector layer 53 are completely isolated from effluent water. Here, the second internal screw threads 59b may be formed to connect the discharge pipe to the extension portion 51a of the second cap housing 51. Alternatively, the second cap housing 51 may not include the extension portion 51a, and the second internal screw threads 59b may be formed only on the remaining inner circumferential surface of the outlet cap 50, which may then be coated with a hydrophobic polymer. Thereby, the second copper layer 52 and the second current collector layer 53 are completely isolated from effluent water at the inner circumference of the outlet cap 50, and may thus be prevented from corroding.

In the second cap housing 51 of the outlet cap 50, a second terminal hole 56 is formed at a position spaced apart from the central hole by a predetermined interval, and one end of the second terminal 23 is integratedly formed with the second copper layer 52 through the second terminal hole 56, and the remaining end thereof is exposed outside the module housing 20 so as to be connected to the power source. Here, the hydrophobic polymer coating layer may be selectively formed on a portion of the outer circumference of the second terminal 23.

The bipolar CDI electrode module 100 may operate in a bipolar manner, in which one of the first and second terminals 21 and 23 forms an anode and the other terminal forms a cathode, and in which a positive potential is applied to the anode and a negative potential is applied to the cathode. Thereby, the first copper layer 42 and the second copper layer 52 connected to respective terminals exhibit the characteristics of an anode or a cathode, and thus the same potential as that of the copper layer is applied to the first current collector layer 43 and the second current collector layer 53 stacked on the copper layer.

Accordingly, one surface of the bipolar CDI electrode 10 disposed between the first current collector layer 43 and the second current collector layer 53 is charged to become an anode, and the other surface is charged to become a cathode. Thus, ions contained in water flowing between two bipolar CDI electrodes 10 may be adsorbed by the electrodes having opposite charges and may thus be removed.

For example, when positive potential and negative potential are applied to the first terminal 21 and the second terminal 23, respectively, the first copper layer 42 and the first current collector layer 43 are charged to become an anode, and the second copper layer 52 and the second current collector layer 53 are charged to become a cathode, whereby the surface of the bipolar CDI electrodes 10 facing the first copper layer 42 may be charged to become a cathode, and the surface facing the second copper layer 52 may be charged to become an anode, thereby removing ions contained in water. The desorption process may be performed by applying opposite potentials to the anode and cathode.

The hydrophobic polymer coating layer may be made of at least one material selected from the group consisting of a fluorine-based polymer, such as polytetrafluoroethylene (PTFE) and polyvinylidene fluoride (PVDF), polyethylene terephthalate (PET), polypropylene (PP), methylcyclohexane, and epoxy, but the kinds of material are not limited to these. Preferably, a polymer containing at least one functional group selected from the group consisting of methylcyclohexane, polytetrafluoroethylene, and epoxy is used.

The first cap housing 41 and the second cap housing 51 may be made of an engineering plastic material having high durability, and the engineering plastic material may include at least one selected from the group consisting of polyvinyl chloride (PVC), polystyrene (PS), high-density polyethylene (HDPE), acrylonitrile butadiene styrene (ABS) copolymer, polyphenylene oxide (PPO), polyamide (PAm), polycarbonate (PC), polybutylene terephthalate (PBT), polysulfone (PSF), polyphenylene sulfide (PPS), polyetherimide (PEI), polyethersulfone (PES), polyarylate (PAR), polyether ether ketone (PEEK), polytetrafluoroethylene (PTFE), polyamideimide (PAI), and polyimide (PI).

Also, a reinforced engineering plastic material, obtained by reinforcing the above engineering plastic material with glass fiber, carbon fiber, or inorganic filler, may be used. An acrylonitrile butadiene styrene (ABS) copolymer having superior mechanical properties and high corrosion resistance is preferably used.

Positive potential or negative potential is applied to the first copper layer 42 and to the second copper layer 52, and these copper layers may be formed to a thickness of 3 to 10 mm. The first current collector layer 43 and the second current collector layer 53 are made of a graphite material, and preferably have a thickness of 100 to 500 μm.

A conductive adhesive layer (not shown) may be further formed between the first copper layer 42 and the first current collector layer 43 and between the second copper layer 52 and the second current collector layer 53, and the conductive adhesive layer may be formed of at least one metal paste material selected from the group consisting of a nickel paste, a silver paste, a copper paste, a platinum paste, a gold paste, and an iron paste.

The conventional CDI electrode module is configured such that individual parts are integratedly formed, or are non-removably attached to the housing or to other parts. In the case where some parts have problems, the CDI electrode module has to be completely disassembled and then reassembled for repair. Since it is difficult or impossible to disassemble the CDI electrode module, the conventional CDI electrode module is disadvantageous because maintenance and management are difficult.

In contrast, the bipolar CDI electrode module 100 of the present invention is configured such that the first inlet cap 30, the second inlet cap 40, the outlet cap 50, and the first terminal 21 may be removably attached to the bipolar CDI electrode module 100. In the case where problems occur in the bipolar CDI electrode module 100 during operation, individual parts may be easily disassembled, repaired, and then reused. Furthermore, when repair is impossible, easy part replacement becomes possible and thus maintenance and management of the bipolar CDI electrode module of the invention may be realized efficiently and simply.

Figure 6:
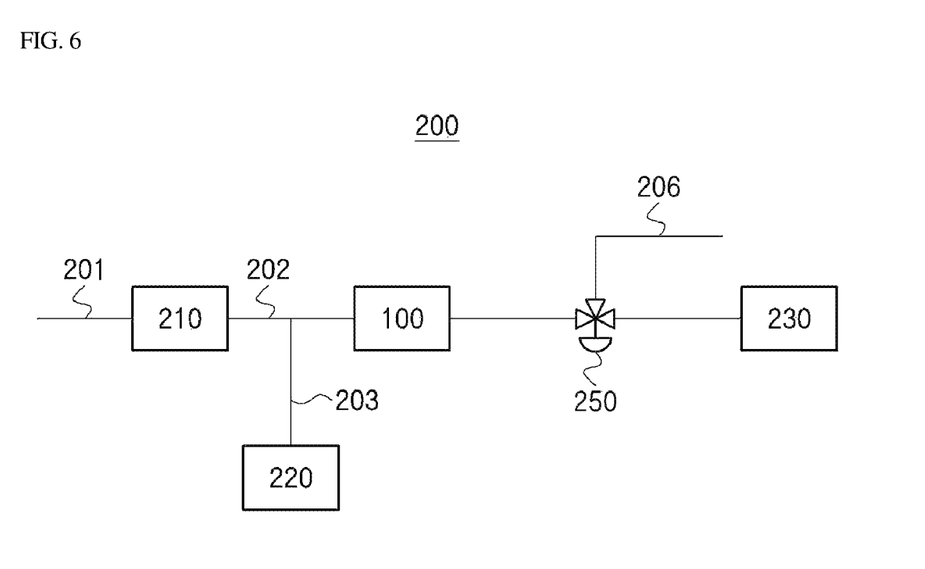
FIG. 6 is a block diagram of a water treatment apparatus employing using the bipolar CDI electrode module according to an embodiment of the present invention.

In addition, still another embodiment of the present invention pertains to a water treatment apparatus 200 using the bipolar CDI electrode module 100, the water treatment apparatus 200 comprising a raw water supply pipe 201, a filter 210 for filtering particulate matter contained in the raw water supplied from the raw water supply pipe 201, and a bipolar CDI electrode module 100 for desalinating the filtrate filtered through the filter 210. As such, a washing water supply pipe 203 that receives washing water from a clean-in-place (CIP) tank 220 may be connected to a connection pipe 202 for connecting the filter 210 and the bipolar CDI electrode module 100.

The raw water supplied through the raw water supply pipe 201 contains a large amount of salts, and may also include various impurities in addition to salts. In the case where such impurities are introduced to the bipolar CDI electrode module 100, the bipolar CDI electrode module 100 may fail to operate, and thus the filter 210 is provided between the raw water supply pipe 201 and the bipolar CDI electrode module 100 to remove impurities, thereby increasing the lifetime of the bipolar CDI electrode module 100.

The filter 210 may be, but is not limited to, at least one selected from the group consisting of a cartridge filter, a plate-type filter, a spiral filter, a flat-membrane-cell-type filter, an immersion-type filter, and a tubular filter.

The water treatment apparatus 200 may employ a single bipolar CDI electrode module such as the bipolar CDI electrode module 100 of FIG. 3. Alternatively, the water treatment apparatus 200 may employ two or more such bipolar CDI electrode modules 100. That is, the bipolar CDI electrode module 100 of the water treatment apparatus 200 may consist of a plurality of bipolar CDI electrode modules, which are disposed in an arrangement including at least one of a parallel connection of the bipolar CDI electrode modules and a series connection of the bipolar CDI electrode modules. The arrangement may improve the water treatment performance or increase the rate of water treatment (amount per hour).

A three-way valve 250 is provided to an outflow pipe for releasing effluent water from the bipolar CDI electrode module 100. Thereby, when the adsorption process is performed, the effluent water is controlled to flow only to a fresh water storage tank 230, and when the desorption process is performed, the effluent water is controlled to flow only to a drain pipe 206. Thus, brine water may not flow into the fresh water storage tank 230 that collects the desalinated effluent water through the adsorption process.

The desorption process may be carried out by blocking the supply of raw water supplied from the filter 210 and receiving the washing water supplied from the OP tank 220, and the effluent water may be drained through the drain pipe 206 during the desorption process. Here, the washing water may include water containing no salt or water having a low salt concentration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bipolar capacitive deionization (CDI) electrode module comprising:
    a cylindrical module housing having a central hole;
    a first inlet cap and an outlet cap respectively provided at opposite ends of the module housing, each of the first inlet cap and the outlet cap having a central hole;
    a second inlet cap and at least one bipolar CDI electrode sequentially disposed at predetermined intervals between the first inlet cap and the outlet cap;
    a first terminal joined to the second inlet cap through the first inlet cap; and
    a second terminal joined to the outlet cap,
    wherein each of the first inlet cap, the outlet cap, the second inlet cap, and the at least one bipolar CDI electrode is circular.

2. The bipolar CDI electrode module of claim 1, wherein the first terminal and the second terminal are made of a copper material.

3. The bipolar CDI electrode module of claim 1, further comprising a hydrophobic polymer coating layer formed on a portion of an outer circumference of the first terminal.

4. The bipolar CDI electrode module of claim 3, wherein the hydrophobic polymer coating layer includes at least one selected from the group consisting of polytetrafluoroethylene (PTFE), polyvinylidene fluoride (PVDF), polyethylene terephthalate (PET), polypropylene (PP), and epoxy.

5. The bipolar CDI electrode module of claim 1,
    wherein the second inlet cap includes:
    a first cap housing, and
    a first copper layer, a first current collector layer, and a first nano-carbon coating layer sequentially arranged on a surface of the first cap housing, the first copper layer and the first current collector layer being completely sealed by the first cap housing; and
    wherein the outlet cap includes:
    a second cap housing, and
    a second copper layer, a second current collector layer, and a second nano-carbon coating layer sequentially arranged on a surface of the second cap housing, the second copper layer and the second current collector being completely sealed by the second cap housing.

6. The bipolar CDI electrode module of claim 5, wherein the first terminal is formed to penetrate the second inlet cap up to the first copper layer and is configured to be removably attached to the first inlet cap and the second inlet cap.

7. The bipolar CDI electrode module of claim 1, further comprising a hydrophobic polymer coating layer respectively disposed over inner and outer circumferential surfaces of each of the at least one bipolar CDI electrode.

8. The bipolar CDI electrode module of claim 7, wherein the hydrophobic polymer coating layer includes at least one selected from the group consisting of polytetrafluoroethylene (PTFE), polyvinylidene fluoride (PVDF), polyethylene terephthalate (PET), polypropylene (PP), and epoxy.

9. The bipolar CDI electrode module of claim 1, further comprising a nano-carbon coating layer formed on at least top and bottom surfaces of each of the at least one bipolar CDI electrode.

10. The bipolar CDI electrode module of claim 1, wherein one of the first terminal and the second terminal is formed as an anode and the other of the first terminal and the second terminal is formed as a cathode.

11. The bipolar CDI electrode module of claim 1, wherein one surface of each of the at least one bipolar CDI electrode is formed as an anode and the other surface of the bipolar CDI electrode is formed as a cathode.

12. The bipolar CDI electrode module of claim 1, wherein the at least one bipolar CDI electrode consists of a plurality of bipolar CDI electrodes.

13. The bipolar CDI electrode module of claim 1, wherein the first inlet cap is configured to be removably attached to the module housing.

14. The bipolar CDI electrode module of claim 13, wherein the second inlet cap includes an outer circumferential surface on which first screw threads are formed such that the second inlet cap can be removably attached to the module housing, and wherein the outer circumferential surface has a flow path groove.

15. The bipolar CDI electrode module of claim 1, wherein the outlet cap has an outer circumferential surface on which second screw threads are formed such that the outlet cap can be removably attached to the module housing.

16. A water treatment apparatus comprising:
    a raw water supply pipe;
    a cartridge filter for filtering particulate matter contained in raw water supplied from the raw water supply pipe; and
    a bipolar capacitive deionization (CDI) electrode module for desalinating a filtrate filtered through the cartridge filter, the bipolar CDI electrode module comprising:
    a cylindrical module housing having a central hole;
    a first inlet cap and an outlet cap respectively provided at opposite ends of the module housing, each of the first inlet cap and the outlet cap having a central hole;
    a second inlet cap and at least one bipolar CDI electrode sequentially disposed at predetermined intervals between the first inlet cap and the outlet cap;
    a first terminal joined to the second inlet cap through the first inlet cap; and
    a second terminal joined to the outlet cap,
    wherein each of the first inlet cap, the outlet cap, the second inlet cap, and the at least one bipolar CDI electrode is circular.

17. The water treatment apparatus of claim 16, wherein the bipolar CDI electrode module consists of a plurality of bipolar CDI electrode modules disposed in an arrangement including at least one of a parallel connection of the bipolar CDI electrode modules and a series connection of the bipolar CDI electrode modules.

* * * * *